(12) United States Patent
Hirath et al.

(10) Patent No.: US 6,408,841 B1
(45) Date of Patent: Jun. 25, 2002

(54) HEAT INSULATED HOUSING FOR A REFRIGERATION DEVICE AND A DOMESTIC OVEN

(75) Inventors: Jürgen Hirath, Heidenheim; Markus Schütte, Nürnberg, both of (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 0 days.

(21) Appl. No.: 09/495,792

(22) Filed: Feb. 1, 2000

Related U.S. Application Data

(62) Division of application No. 09/174,293, filed on Oct. 16, 1998.

(30) Foreign Application Priority Data

Oct. 16, 1997 (DE) .......................................... 197 45 825

(51) Int. Cl.[7] .............................. A21B 1/00; A47J 39/00; F25D 23/00

(52) U.S. Cl. ................................ 126/19 R; 126/273 R; 126/190; 220/592.01; 220/592.09; 312/406; 312/401

(58) Field of Search ........................... 126/19 R, 273 R, 126/190; 220/592.09, 592.05, 592.06, 592.07, 592.01, 592.02, 592.1; 52/788.1, 790.1, 792.1; 62/DIG. 13, 440, 447; 312/406, 401, 404, 405, 400; 428/69

(56) References Cited

U.S. PATENT DOCUMENTS

| 1,774,860 A | | 9/1930 | Wendler et al. ............. 165/170 |
|---|---|---|---|
| 1,845,353 A | * | 2/1932 | Snell ...................... 220/592.05 |
| 1,969,621 A | | 8/1934 | Munters ................ 220/DIG. 9 |
| 2,855,636 A | * | 10/1958 | Donnelly ............... 220/592.06 |
| 2,939,811 A | | 6/1960 | Dillon ................... 220/592.09 |
| 2,986,301 A | * | 5/1961 | Donnelly ............... 220/592.07 |
| 3,161,265 A | | 12/1964 | Matsch et al. ............. 52/788.1 |
| 3,472,570 A | | 10/1969 | Moran ........................ 312/406 |
| 3,913,996 A | * | 10/1975 | Benford ................... 220/592.1 |
| 5,586,680 A | * | 12/1996 | Dellby et al. .......... 220/592.09 |
| 5,632,543 A | * | 5/1997 | McGrath et al. ............ 312/406 |
| 6,029,846 A | * | 2/2000 | Hirath et al. ........... 220/592.09 |

FOREIGN PATENT DOCUMENTS

| DE | 1 501 237 | * 12/1969 |
|---|---|---|
| GB | 1 061 204 | * 5/1964 |

* cited by examiner

*Primary Examiner*—Henry Bennett
*Assistant Examiner*—Josiah C. Cocks
(74) *Attorney, Agent, or Firm*—Laurence A. Greenberg; Werner H. Stemer; Gregory L. Mayback

(57) ABSTRACT

A heat insulated wall having two surface layers disposed at a distance from one another and are at least substantially vacuum-tight in construction. The two surface layers together with an at least substantially vacuum-tight connection element enclose an evacuable space that is filled with an evacuable thermal insulation material. The surface layers have angled sections with free ends directed away from the space and on which the connection element is disposed and is fastened in a vacuum-tight fashion to the angled sections.

2 Claims, 2 Drawing Sheets

HEAT INSULATED HOUSING FOR A REFRIGERATION DEVICE AND A DOMESTIC OVEN

CROSS-REFERENCE TO RELATED APPLICATION

This is a division of U.S. application Ser. No. 09/174,293, filed Oct. 16, 1998.

BACKGROUND OF THE INVENTION

Field of the Invention

The invention relates to a heat insulated wall having two surface layers disposed at a distance from one another and being at least substantially vacuum-tight in construction which together with an at least substantially vacuum-tight connection element enclose an evacuable space which is filled with an evacuable thermal insulation material.

With heat insulated walls based on vacuum insulation technology it is known for the outer surface layers, which are at a distance from one another, to be connected to one another in a vacuum-tight fashion by a connection profile which is substantially U-shaped in cross section. The connection profile is inserted between the surface layers in such a way that the free leg ends thereof face the edges of the surface layers and end substantially flush with them. With this type of connection of the two surface layers it is absolutely necessary to furnish the base of the connection profile with a thickness of material which must lie within the same order of magnitude as that of the surface layers. This is necessary in order to achieve some rigidity for the tensioning forces which are required as part of the manufacturing process and which have to be exerted exclusively outside the insulation compartment, owing to its lack of accessibility, on the heat insulated wall. As a consequence of the increased thickness of material in the area of the base of the connection profile, and when using inexpensive thermal insulation materials which serve as both supporting and insulating material and are to be introduced into the space between the surface layers, such as open-cell polyurethane foam or open-cell polystyrene foam or the like, a heat bridge is produced which has a considerable adverse effect on the insulation capacity of the heat insulated wall. To avoid this adverse effect, the known walls are filled with expensive fiber materials that in addition, owing to their relatively high specific weight, represent a marked increase in weight of the walls. Thereby, considerably hindering the handling of the walls in production or, where the latter are employed, for example, for a refrigeration device, such as a household refrigerator or home freezer, considerably hindering the mobility of the device.

SUMMARY OF THE INVENTION

It is accordingly an object of the invention to provide a heat insulated wall that overcomes the above-mentioned disadvantages of the prior art devices of this general type, which has simple constructional measures.

With the foregoing and other objects in view there is provided, in accordance with the invention, a heat insulated wall, including: an at least substantially vacuum-tight connection element; an evacuable thermal insulation material; and two surface layers disposed at a distance from one another and being at least substantially vacuum-tight in construction, the two surface layers together with the at least substantially vacuum-tight connection element enclose an evacuable space filled with the evacuable thermal insulation material, the two surface layers having angled sections with free edges directed away from the evacuable space, the at least substantially vacuum-tight connection element disposed on and fastened to the angled sections in a vacuum-tight fashion.

The object is achieved in accordance with the invention by the surface layers having along their free edges an angled section which is directed away from the evacuable space and on which the connection element bears and is fastened in a vacuum-tight fashion.

With a construction technique of this kind it is possible without exception to employ individual parts of simple geometry in the form of planar sheet metal sections which are inexpensive to produce. In addition, the sections on the surface layers and the connection element which have to be tensioned with respect to one another using tensioning tools are readily accessible, so that, firstly, very simple tensioning tools can be employed owing to the ready accessibility of the tensioning points and a connection element equipped with a sheet-like wall thickness can be used, since the element no longer has to be used to absorb any tensioning forces. The use of a connection element equipped with a sheet-like wall thickness gives the possibility of filling the space between the surface layers with an inexpensive thermal insulation material, such as open-cell polyurethane foam or open-cell polystyrene foam, for example, without thereby adversely affecting the heat insulation properties. When the thermal insulation materials are used the sheet-like connection element constitutes only a negligible heat bridge.

In a preferred embodiment of the subject matter of the invention it is provided that the connection element is configured as a flat profile with two edge strips having at least essentially the same width and thickness of material as the angled sections a and between which there is disposed a sheet-like intermediate piece which bridges at least the evacuable space.

Using edge strips whose thickness of material is in the same range as that of the angled sections, the connection element fabricated, for example, from stainless steel or steel sheet, can be fixed in a particularly reliable and rapid manner by welding to, for example, surface layers fabricated from stainless steel or steel sheet, and with high processing reliability. The sheet-like intermediate piece at the same time provides coverage of the space between the surface layers with minimal thermal conduction.

In a further preferred embodiment of the subject matter of the invention it is provided that the sheetlike intermediate piece with its lateral sections is fastened in a vacuum-tight fashion to the surface layers as a spacer between the edge strips and the angled sections.

The results of this are individual parts which are particularly simple and inexpensive to produce and which, moreover, can be joined in a particularly functionally reliable manner and can be connected to one another with particular processing reliability.

The vacuum-tight fastening of the spacer can be produced both with particular processing reliability and in a particularly inexpensive way if in a subsequent advantageous embodiment of the subject matter of the invention it is provided that the vacuum-tight fastening of the spacer is brought about by welding.

In terms of fabrication the connection element is easy to produce and particularly simple to handle if it is provided that the connection element is composed of a plurality of longitudinal sections.

In a subsequent preferred embodiment of the subject matter of the invention it is provided that the longitudinal sections are guided in one piece and jointlessly over the corner regions of the walls.

Therefore, potential problems with the leak-tightness of the vacuum insulation as a result of points of connection accumulating in the corner regions, in the form, for example, of accumulations of weld seams in the case of surface layers and connection elements fabricated from stainless steel or steel sheet, are made less acute. The one-piece corner profiles also ensure that the desired geometry, which is also required on functional grounds, is always maintained, since the corner profiles can be employed, for example, as preformed or prefabricated components and the corner on the heat insulation walls need not be brought about only by profile sections which are not joined until the fabrication stage. Moreover, the one-piece corner profiles make it possible to use different corner configurations, such as rounded corners, for example, which permit a continuous, uninterrupted and therefore, in processing terms, reliable welding operation when the surface layers are welded to the connection profile.

In a further preferred embodiment of the subject matter of the invention, it is provided that the longitudinal sections are each supported by a support element which is fastened in a vacuum-tight fashion to the surface layers for supporting the region where two longitudinal sections are joined to one another.

By introducing such support elements, whose wall thickness lies, for example, in the same order of magnitude as the thickness of the material of the surface areas, the longitudinal sections can be adjusted with particular ease and rapidity with respect both to one another and to the surface layers, thereby providing a significant increase in the speed of the fabrication process. Furthermore, the support elements also have the capacity to absorb tensioning forces which may be applied as a result of the production process.

In a subsequent preferred embodiment of the subject matter of the invention it is provided that the longitudinal sections are covered where they join with one another in each case by a cover element which is connected in a vacuum-tight fashion to the surface layers and to the support element.

By using cover elements at the joint sites between the joined longitudinal sections, the latter can be connected to one another in a particularly purposeful and fabrication-friendly manner to form a vacuum-tight connection element. The vacuum-tight connection of the cover element to the support elements fastened in vacuum-tight fashion to the surface layers results in a vacuum-tight assembly being produced even when there are joint gaps of different widths between the joined-together longitudinal sections as a consequence of their production tolerances.

The heat insulated walls can be produced in a particularly reliable manner in processing terms by mass production if it is provided that the surface layers, the connection element, the support element and the cover element are formed from weldable metallic materials.

A particularly environment-friendly refrigeration device possessing a high heat insulation capacity, having a heat insulated housing and a functional compartment which is disposed therein and can be closed by a heat insulated door, can be produced if in a subsequent preferred embodiment of the subject matter of the invention it is provided that the heat insulated housing and the door are configured as set forth in the invention. The high heat insulation capacity also makes it possible to reduce the wall thickness of the heat insulated housing and therefore enlarge the useful capacity of the cooling or freezing compartment with unchanged external dimensions.

In a similarly, particularly environmentally compatible manner, with a relatively high heat insulation capacity and an increased useful capacity with unchanged external dimensions it is possible to produce an oven muffle for a domestic oven, having a heat-insulated oven muffle which can be closed by a door, if in a final preferred embodiment of the subject matter of the invention it is provided that the oven muffle is configured as set forth in the invention. Other features which are considered as characteristic for the invention are set forth in the appended claims.

Although the invention is illustrated and described herein as embodied in a heat insulated wall, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
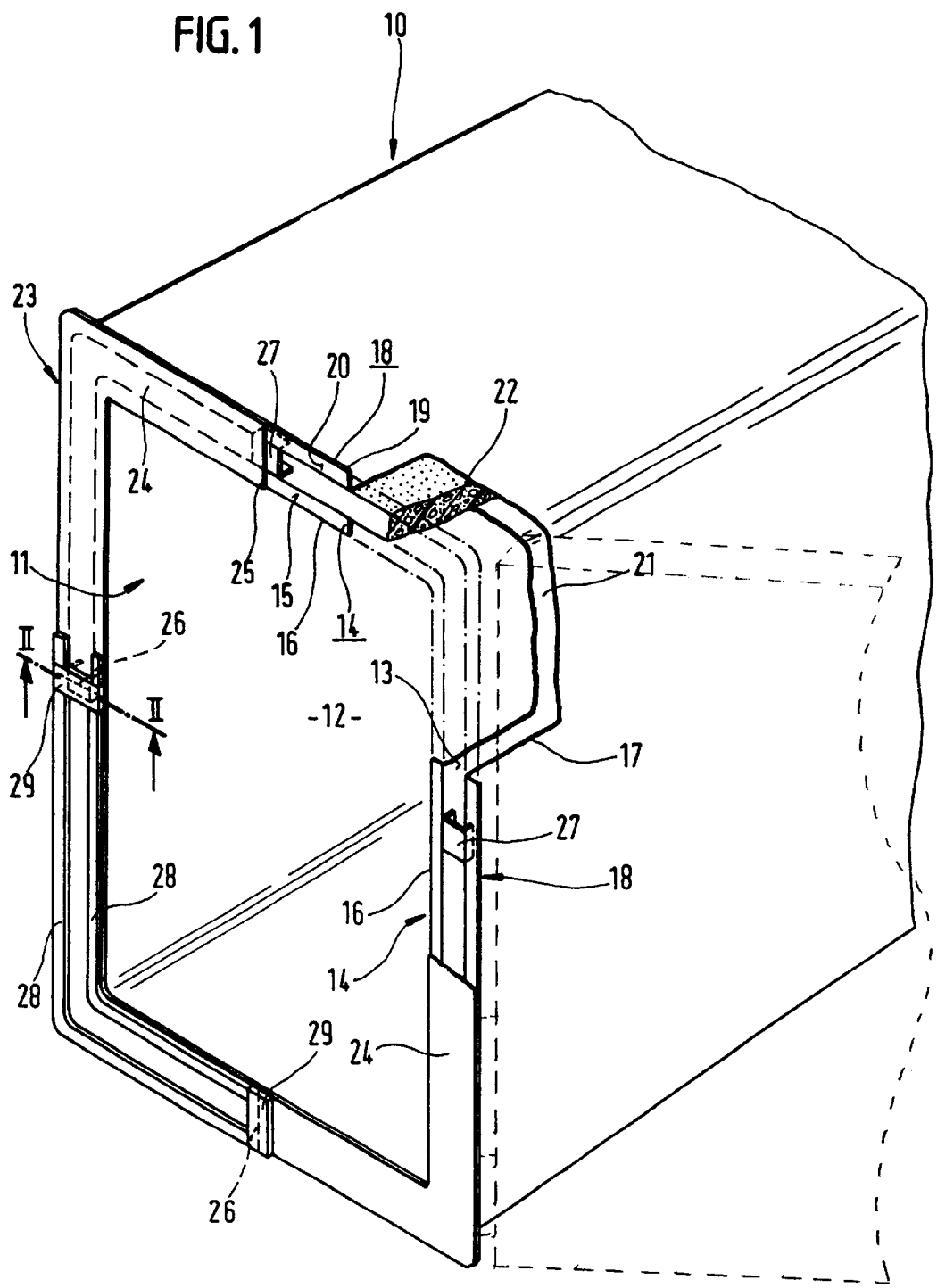
FIG. 1 is a partially broken away, side perspective view of a vacuum-insulated housing of a domestic refrigeration device whose surface layers serve as housing walls and are disposed at a distance from one another and are connected at their free edges on a side of an access opening of the device by a connection element according to the invention.
Figure 2:
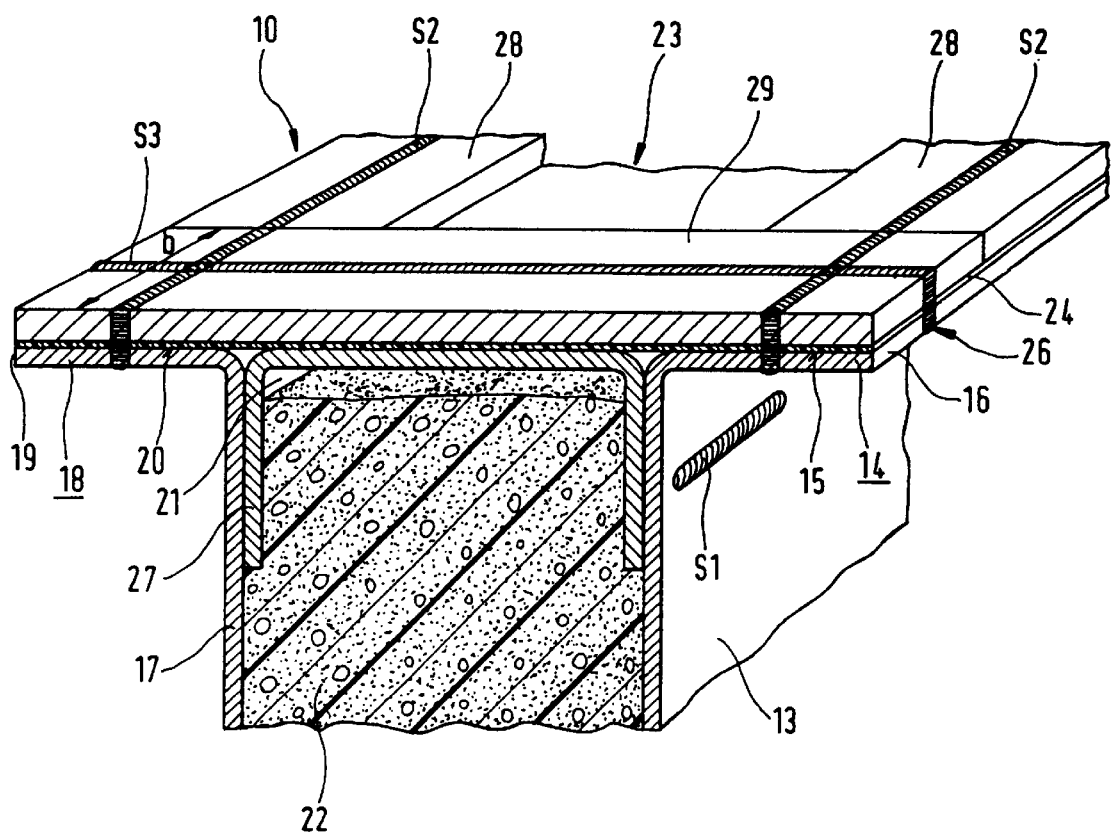
FIG. 2 is an enlarged, fragmentary, perspective, partially sectional view through the line II—II of FIG. 1 showing the wall of the housing and the door.

In all the figures of the drawing, sub-features and integral parts that correspond to one another bear the same reference symbol in each case. Referring now to the figures of the drawing in detail and first, particularly, to FIG. 1 thereof, there is shown a heat insulated housing 10 which can be used for a domestic refrigeration device, such as a household refrigerator or a home freezer. The insulated housing 10 has a storage compartment 12 that is accessible via an access opening 11 and is configured as a cooling or freezing compartment. The compartment 12 is lined with an inner surface layer 13 which serves as an interior lining that is configured as a pipe structure and consists, for example, of stainless or corrosion-protected steel sheet with a thickness of material of, for example, 0.4 mm. The inner surface layer 13 is provided at its end section facing the access opening 11 with an angled section 14 that is disposed essentially perpendicular to the inner surface layer 13. The surface of the angled section 14, facing away from the storage compartment 12, serves as a bearing surface 15 whose free edge 16 delimits the free opening cross section of the access opening 11. The inner surface layer 13 is enveloped by an outer surface layer 17 that serves as an exterior lining of the housing 10. The walls of the outer surface layer 17 are disposed at a distance from the walls of the inner surface layer 13 so that the two surface layers 13 and 17 are joined like two pipes plugged into one another. The outer surface layer 17 is provided at its end section facing the access opening 11 with an angled section 18. The angled section 18 is produced by noncutting deformation of the outer surface layer 17. The angled section 18 has a free edge 19 facing away from the surface layer 13, and whose outer surface, like that of the angled section 14, serves as a bearing surface 20. The bearing surface 20 like that of the inner surface layer 13, is disposed essentially perpendicular to the surface of the outer surface layer 17 and extends at essentially the same height as the bearing surface 15 on the inner surface layer 13. Between the inner surface layer 13 and the outer surface layer 17, which surrounds it in the manner of an envelope, the equal distancing of the walls of the outer surface layer 17 from the walls of the inner surface layer 13 produces a space 21. The space 21 is filled with an evacuable thermal insulation material 22, such as open-cell polyurethane foam or open-cell polystyrene foam, and which is closed in a vacuum-tight fashion on its rear side opposite the access opening 11. On the side of the access opening 11, the space 21 is closed off in vacuum-tight fashion by a connection element 23 which extends along the angled sections 14 and 18, respectively, and at its free edges is fastened in vacuum-tight fashion to their bearing surfaces 15 and 20, respectively. The connection element 23 is of essentially flat-profiled construction and is composed of a plurality of sections 24 that extend in one piece and jointlessly over the corner region of the housing 10. The sections 24 are fabricated from a sheet-like material such as, for example, a stainless steel sheet with a thickness of material of 0.1 mm. The sheet-like sections 24, which extend up to the free edges of the angled section 14 or 18, respectively, are joined to one another by their end sections 25 to form a joint 26. The end sections 25 being supported at the joint 26 by a support element 27 having a substantially U-shaped cross section or profile. The support element 27 is fabricated, for example, from a stainless steel sheet lying within the range of thickness of material of the surface layers 13 and 17. The support element 27 is fastened in a vacuum-tight fashion by its legs to the inside, facing the space 21, of the surface layers 13 and 17, by a weld seam S1 (FIG. 2). In addition to the sheet-like sections 24, the connection element 23 also includes edge strips 28, which lie within the range of thickness of material of the surface layers 13 and 17. The edge strips 28 have essentially the same width as the bearing surface 15 or 20, respectively, and like the sections 24, are guided continuously in one piece over the corner regions of the housing 10. The edge strips 28 are also fastened in vacuum-tight fashion along the bearing surface 15 by a weld seam S2. The sheet-like sections 24 are disposed as a spacer between the angled section 14 and 18, respectively, and the edge strips 28 are connected in vacuum-tight fashion by the weld seam S2 to the surface layer 13 or 17, respectively. The edge strips 28 are in each case shortened at the joint 26 essentially by half the width b (FIG. 2) of a cover element 29 which lies within the range of thickness of material of the surface layers 13 and 17. The cover element 29 is fabricated, for example, from stainless or corrosion-protected steel sheet, and which by virtue of the shortening of the edge strips 28 is able to fill the gap formed relative to the sections 24. The cover element 29, which ends essentially flush with the free edges of the angled sections 14 and 18, serves for vacuum-tight coverage of the joint 26 of the end sections 25. The vacuum-tight assembly is produced using a weld seam S3 which crosses the weld seams S2. The weld seam S3 extends over the entire length of the cover element 29 and connects the cover element 29 in a vacuum-tight fashion to both the angled sections 14 and 18 and to the base of the U-shaped support element 27. By using the cover elements 29 employed at the joints 26 of the sections 24, in combination with the edge strips 28 and the sheet-like sections 24, the two surface layers 13, 17 are connected to one another in a vacuum-tight form with minimal thermal conduction between them, so that in cooperation with the means which are not shown but which on the rear, connect the two surface layers to one another in a vacuum-tight fashion, the space 21 is closed off in such a way that it can be evacuated.

In a modification of the present connection element 23, it would be conceivable to produce the edge strips 28 by folding over, several times, the length-wise edges of the sheet-like sections 24.

The novel heat insulated wall described in the example of the heat insulated housing 10 for a household refrigerator or home freezer is also suitable for constructing a door of a domestic refrigeration device and for producing a heat insulated oven muffle which is employed in connection with a domestic oven. The latter application requiring full adaptation of the thermal insulation material serving as a support material in the evacuated space to the operating temperatures that commonly prevail in ovens.

We claim:

1. A heat insulated housing for a refrigeration device, comprising:
    a heat insulated housing body with a functional compartment;
    a heat insulated door connected to said heat insulated housing body for closing said heat insulated housing body;
    said heat insulated housing body and said heat insulated door each including:
        an at least substantially vacuum-tight thin-walled connection element having two edge strips;
        an evacuable thermal insulation material; and
        two surface layers disposed at a distance from one another and being at least substantially vacuum-tight in construction, said two surface layers together with said at least substantially vacuum-tight connection element enclosing an evacuable space filled with said evacuable thermal insulation material, said two surface layers having angled sections with a given thickness and free edges directed away from said evacuable space, said at least substantially vacuum-tight connection element disposed on and fastened to said angled sections in a vacuum-tight fashion, and said two edge strips having a thickness substantially equal to the given thickness of said angled sections.

2. A domestic oven, comprising:
    a heat-insulated oven muffle;
    a door connected to said heat-insulated oven muffle for closing said heat-insulated oven muffle;
    said heat-insulated oven muffle and said door each including:
        an at least substantially vacuum-tight thin-walled connection element having two edge strips;
        an evacuable thermal insulation material; and
        two surface layers disposed at a distance from one another and being at least substantially vacuum-tight in construction, said two surface layers together with said at least substantially vacuum-tight connection element enclosing an evacuable space filled with said evacuable thermal insulation material, said two surface layers having angled sections with a given thickness and free edges directed away from said evacuable space, said at least substantially vacuum-tight connection element disposed on and fastened to said angled sections in a vacuum-tight fashion, and said two edge strips having a thickness substantially equal to the given thickness of said angled sections.

* * * * *